Oct. 25, 1932.   E. W. HARVEY   1,885,012
PROCESS AND APPARATUS FOR THE TREATMENT OF LIQUIDS WITH AMMONIA
Filed April 17, 1929
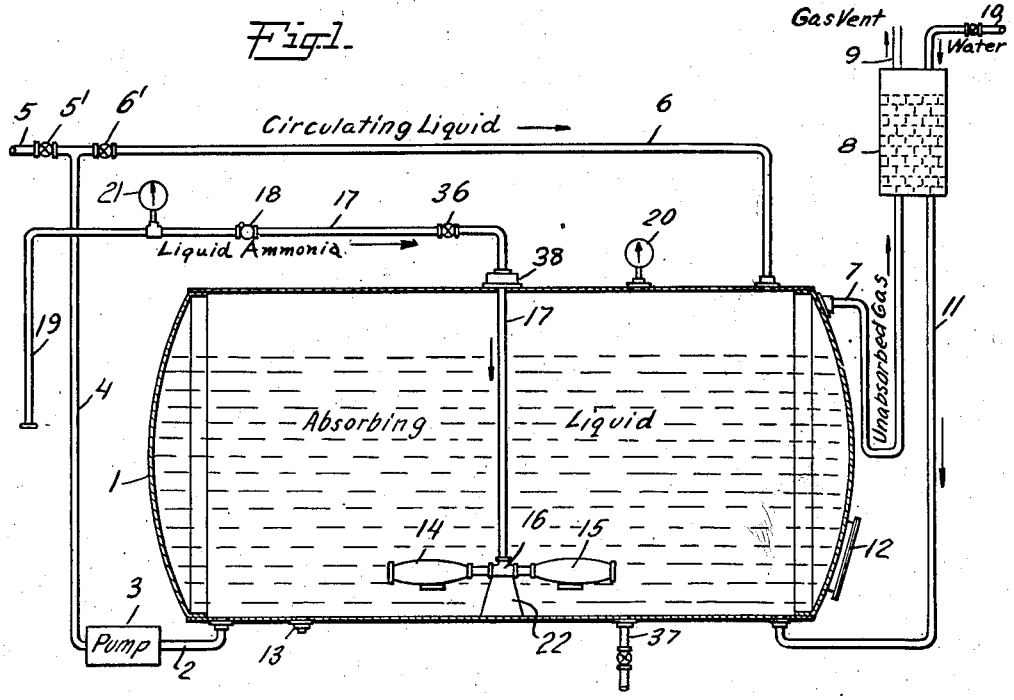
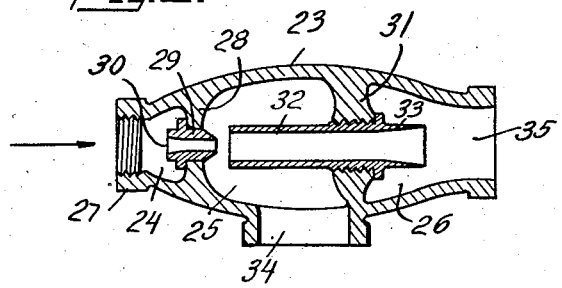
Edward W. Harvey
INVENTOR
BY Forbes Silsby
ATTORNEY Patented Oct. 25, 1932

1,885,012

UNITED STATES PATENT OFFICE

EDWARD W. HARVEY, OF HIGHLAND PARK, NEW JERSEY, ASSIGNOR TO THE BARRETT COMPANY, OF NEW YORK, N. Y., A CORPORATION OF NEW JERSEY

PROCESS AND APPARATUS FOR THE TREATMENT OF LIQUIDS WITH AMMONIA

Application filed April 17, 1929. Serial No. 355,802.

This invention relates to a process and apparatus for the treatment of liquids with ammonia. In particular this invention relates to the production of solutions of ammonia from anhydrous liquid ammonia.

Solutions of ammonia have heretofore been prepared by dissolving gaseous ammonia in a liquid. In many commercial operations, however, the ammonia is supplied in the anhydrous form as a liquid in tank cars or other containers. It is impracticable to evaporate the liquid from these containers in order to obtain gaseous ammonia without providing means for heating the container to counteract the cooling effect of the vaporizing ammonia which tends to chill the remaining liquid and thus make exceedingly slow further vaporization. Supplying heat to the shipping containers is a troublesome and expensive operation, the alternative to which has been to provide high pressure storage facilities for liquid ammonia and withdraw the ammonia from the shipping containers and pass it into the storage tanks directly as liquid. The storage tanks were so arranged that the liquid ammonia could be volatilized as required for use. When aqua ammonia, for example, was to be prepared from ammonia supplied as a liquid, the liquid ammonia was heated sufficiently to change it from the liquid to the gaseous state and the gas thus formed absorbed in water. The ammonia gas reacted with the water to form aqua ammonia, and as a result of that chemical reaction, large quantities of heat were developed. Since the absorption of ammonia by water is favored by low temperatures in that with increasing temperatures there is a decrease both in the rate at which ammonia is absorbed and the ultimate concentration in the liquid ammonia which may be obtained under a given gas pressure at the surface of the liquid, it was necessary either to introduce the gas into the water sufficiently slowly so that the heat generated could be dissipated to the atmosphere without excessively high temperatures being attained or to artificially remove heat from the absorbing water, for example, by means of cooling water. The former methods of producing aqua ammonia from liquid ammonia involved, therefore, both the supplying of heat to the liquid ammonia in order to convert it into the gas and the removal of heat from the absorbing water. The production of large quantities of aqua ammonia was, therefore, a slow and expensive operation.

An ammonia solution is usually made up on an industrial scale using water as it comes from the local water system. This water contains impurities which are precipitated upon the water becoming alkaline by the addition of the ammonia to form a turbid solution. In order to make a clear ammonia solution from such water, former practice has been to first absorb sufficient gaseous ammonia in the water to precipitate out solid matter and then subject the treated water to a settling operation for removal of the finely divided suspended solid particles. After this preliminary purification, the water was then used for the absorption of the desired quantity of gaseous ammonia. The preliminary purification was an expensive, slow operation, since the solids precipitated by gaseous ammonia are in a finely-divided condition which necessitates long setting for their removal. Even then, within commercially practicable limits, the clarification of the water was relatively incomplete.

My invention has for an object the production of solutions of ammonia hereinafter referred to as aqua ammonia from liquid ammonia in a simple expeditious manner, which does away with the necessity for first vaporizing the liquid and the attendant need for supplying heat thereto. It is another object of my invention to counterbalance to a large extent the heat evolved by the reaction of the ammonia with the liquid in which it is absorbed and thus to provide a process in which the liquid may be relatively quickly treated with substantial amounts of ammonia without the necessity of artificially cooling the liquid as heretofore required.

I have discovered that liquid ammonia may be directly introduced under the surface of or otherwise mixed with liquids with which it reacts or in which it is soluble without explosive effect or violent reaction, and that by so doing, the absorption of the ammonia may be conducted rapidly and completely without necessitating the removal of the large quantities of heat which it was heretofore necessary to remove in order to prevent excessive increases in the temperature of the absorbing liquid. I have further discovered that in the production of aqua ammonia, it is not necessary to subject water containing precipitatable impurities to an expensive preliminary purification when using anhydrous liquid ammonia in order to obtain a pure product. The direct absorption of the desired quantity of ammonia as a liquid in water containing relatively small amounts of materials such as are present as impurities in many natural waters and are precipitated by the addition of ammonia, produces an aqua ammonia in which the precipitated solids are in a flocculent condition and have the property of rapidly settling out from the liquid. The product obtained by the direct absorption of liquid ammonia and containing precipitated solid particles thus has an important characteristic which differentiates the product from ammoniacal solutions such as heretofore have been prepared by treating liquids with gaseous ammonia. That characteristic, i. e., the quick settling character of the solid precipitated matter, makes it possible, when desired, to subject the aqua ammonia product of my invention to a rapid and relatively complete purification by settling.

My invention may be employed for introducing ammonia into a large variety of liquids. For example, mixtures of aqua ammonia and solutions of inorganic or organic salts may be produced. The solutions of inorganic or organic salts are particularly suitable for treatment with liquid ammonia in accordance with the process of this invention, since the presence of the dissolved material lowers the vapor pressure of the solution and thus facilitates the absorption of the ammonia. The liquid ammonia may be introduced into waste solutions, such as liquid or semi-liquid slaughter house refuse or sugar refining refuse for the production of material for use as a fertilizer. Solutions containing acids or solutions containing both acids and salts might be treated with the ammonia for the production of salts, separation of materials, or other known purposes for which ammonia may be employed.

A suitable apparatus embodying my invention is illustrated in the accompanying drawing in which Fig. 1 is a view, partly in section, of a dissolving tank, and Fig. 2 illustrates in section, one of the jet eductors shown in Fig. 1.

The apparatus illustrated in the drawing comprises a closed tank 1 for containing a charge of the liquid to be treated with ammonia. Pipe 2 opens into one end of tank 1 near the bottom and is connected with the inlet of a pump 3. Outlet pipe 4 is branched and communicates with pipes 5 and 6, each of which is provided with a valve 5' and 6" respectively. Pipe 6 opens into tank 1 near the top and at the opposite end from pipe 2. A U-pipe 7 opens into the top of tank 1 above the normal liquid level therein, and is connected with a chamber 8 containing packing material such as is used in gas scrubbers. Chamber 8 is provided with a gas vent 9, a water supply pipe 10 and a return pipe 11 leading back into the bottom of tank 1. An inlet 37 provided with a valve serves for filling the tank with the liquid to be treated. A manhole 12 permits access to the interior of tank 1 for making adjustments or repairs, and a drain 13, which is normally closed, permits any liquid residue to be drained from the tank. Tank 1 may also be provided with a gauge glass and a thermometer for ascertaining the level and the temperature of liquid therein.

Within tank 1, and placed below the normal liquid level therein, are two jet eductors 14 and 15, both of which communicate through a T-connection 16 with a liquid ammonia supply pipe 17 which passes through a gas tight manhole 38 in the top of the tank. T-connection 16 is mounted on a base 22 secured to the bottom of tank 1. Pipe 17 is fitted with a valve 36, check valve 18 which prevents the passage of liquid except in the direction towards the eductors, and a flexible coupling 19 which may be fitted to a liquid ammonia container, such as a tank car so that the liquid ammonia may be passed through pipe 17 to the eductors. Pressure gauges 20 and 21 are provided for tank 1 and pipe 17 respectively.

The jet eductors 14 or 15, as shown in Fig. 2, comprise a casing 23 which defines three chambers 24, 25 and 26. An internally threaded flange 27 serves to secure the eductor to an externally threaded arm of T-connection 16 as shown in Fig. 1. A partition 28 between pressure chamber 24 and chamber 25 is pierced by a nozzle 29 which has a restricted orifice 30 tapering from the inlet end in pressure chamber 24 towards the outlet end in chamber 25. A partition 31 between chambers 25 and 26 is pierced by a tube 32 of larger internal diameter than the outlet end of orifice 30. The tube 32 is reamed out at its outlet end in chamber 26 as shown at 33 and extends within chamber 25 to a point adjacent to the end of nozzle 29 but spaced therefrom sufficiently to allow of liquid in chamber 25 being drawn into and through tube 32 by the action of a jet of fluid forced through nozzle 29. An opening 34 is provided in casing 23 for admitting a liquid in which the eductor is immersed to chamber 25. A second opening 35 in casing 23 is centered opposite the outlet end of tube 32, and through this opening the materials ejected from tube 32 pass into the body of liquid in tank 1.

In making aqua ammonia, for example, employing the apparatus described above, a charge of water is run into tank 1 through inlet 37. Flexible coupling 19 is connected to a liquid ammonia container so arranged that by opening valve 36 the liquid is discharged through coupling 19, pipe 17 and T-connection 16 to a chamber 24 of eductors 14 and 15. The liquid ammonia in the container at ordinary temperatures, is under a relatively high pressure due to the high vapor pressure of liquid ammonia at ordinary temperatures. The liquid ammonia in chamber 24 is, therefore, under a substantial pressure and is vented from chamber 24 as a rapidly moving jet through nozzle 29 and tube 32 which acts to draw a stream of water from the body of liquid in tank 1 outside the eductor through opening 34 and circulate it as a confined stream flowing through chamber 25 and tube 32 back to the body of liquid. The pressure upon the liquid ammonia after it passes valve 36 decreases in its travel through pipe 17, and a portion of the liquid ammonia may be volatilized and serve to precool the ammonia which subsequently reacts with water. This tends to neutralize the heat effect of the reaction. In addition, the water in the tank may be cooled by heat transfer through the walls of the pipe. If desired, this indirect cooling of the contents of the tank may be facilitated by developing pipe 17 as a coil immersed in the liquid in the tank. When the unvolatilized portion of the liquid ammonia is introduced into the water at the exit end of nozzle 29, further volatilization probably takes place and an intimate admixture of gaseous ammonia, liquid ammonia and water is formed and ejected from tube 32. The ammonia and water are cooled and simultaneously react to form aqua ammonia. The materials are forced through opening 35 and serve to agitate the contents of tank 1. In this manner liquid ammonia and water are intimately admixed and the ammonia and water rapidly and completely react to form aqua ammonia. While the ammonia is being passed into the water, valve 5' is closed and valve 6' is open. Pump 3 may be in operation if desired to circulate liquor from the bottom of tank 1 through pipes 2, 4 and 6 to the top of the tank and thus aid to keep the liquid contents of the tank uniform.

Any unabsorbed gases are vented from above the surface of the liquid through U-pipe 7 and are scrubbed in chamber 8 by water introduced through pipe 10. The small amount of ammonia contained in these gases is removed by absorption in the water and the weak ammoniacal solution returned through pipe 11 to mingle with the contents of the tank. The residual gases are discharged from chamber 8 through vent 9. When gases cease passing through pipe 7, liquid from chamber 8 drains down into pipe 7 where it is retained by the U-bend to form a seal between the atmosphere and the interior of tank 1. It is self-evident that this seal also will serve as an automatic pressure relief device, which operates either whenever the pressure within the tank builds up to any considerable extent above atmospheric or whenever it falls and a vacuum is created within the tank.

When liquid ammonia is absorbed in water, the heat evolved is only about one-third as great as when a like quantity of gaseous ammonia is absorbed. Nevertheless, there is a tendency for the liquid in tank 1 to increase somewhat in temperature, and in some cases, particularly when aqua ammonia containing a relatively high percentage of $NH_3$ is to be prepared, it may be advisable to cool the contents of the tank during the reaction. This cooling may be accomplished by spraying the outside of the tank with cooling water or in any other manner.

After the desired quantity of ammonia has been introduced into the water, which may be ascertained either by analysis of samples withdrawn from the tank, or preferably, by introducing a measured quantity of ammonia into a known amount of water, the supply of liquid ammonia is cut off by closing valve 36. By closing valve 6' and opening valve 5', the aqua ammonia may be pumped from the tank through pipe 5 to storage or directly to the place it is to be used. When a clear aqua ammonia is to be produced, and the water employed contains impurities which are precipitated out during the introduction of the ammonia, the aqua ammonia product in tank 1, which contains precipitated solids in a readily settleable condition, may be pumped to a settler and relatively quickly clarified to yield a clear purified product.

It is apparent that numerous modifications may be made in the apparatus described or that the process may be carried out in other types of apparatus. For example, a single ejector of the type described may be employed; or if desired the liquid ammonia may be introduced into the absorbing liquid from a submerged pipe venting into the body of liquid although this practice is not to be preferred since as thorough a mixing action is not obtained as when employing a jet eductor. Furthermore, if highly concentrated ammonia solutions which have a vapor pressure greater than atmospheric at the temperatures attained by the material in tank 1 are to be prepared, it is necessary to absorb the ammonia at super-atmospheric pressures. In such a case the alterations in the apparatus described which would be required to fit it for use at increased pressures, are readily apparent to one skilled in the art.

I claim:

1. The improvement in the treatment of aqueous liquids with ammonia which comprises rapidly and intimately admixing liquid ammonia with said liquid.

2. The improvement in the process of preparing aqua ammonia which comprises introducing liquid ammonia directly into a body of water containing impurities which are precipitated by the ammonia and admixing the liquid ammonia with the water at a point below the surface thereof whereby the impurities are precipitated in a form adapted to settle readily from the aqua ammonia.

3. An apparatus for the treatment of liquids with liquid ammonia comprising in combination a closed tank, a vessel containing liquid ammonia, a liquid ammonia conduit leading from said vessel to within said tank and extending to a point below the normal liquid level within the tank, and means communicating with said conduit at said point for intimately admixing liquid ammonia passed through the conduit with another liquid.

4. An apparatus for the treatment of liquids with liquid ammonia comprising in comination a closed tank, a vessel continining liquid ammonia, a liquid ammonia conduit leading from said vessel to within said tank and extending to a point below the normal liquid level within said tank, means communicating with said conduit at said point for intimately admixing liquid ammonia passed through the conduit with another liquid, a gas vent leading from the tank above the normal liquid level therein, a gas scrubber connected with said gas vent and provided with a liquid inlet and outlet, and a conduit connected with the scrubber outlet and the aforesaid closed tank and terminating therein at a point below the normal liquid level therein.

5. An apparatus for the treatment of liquids with liquid ammonia comprising in combination a closed tank, a vessel containing liquid ammonia a liquid ammonia conduit leading from said vessel to within said tank and extending to a point below the normal liquid level within the tank, and a jet eductor having its pressure chamber in communication with said conduit.

6. The process of treating an aqueous liquid with ammonia which comprises introducing liquid ammonia directly into a confined flowing stream of said liquid.

7. The process of preparing aqua ammonia which comprises introducing liquid ammonia directly into a confined flowing stream of water.

8. The process of preparing aqua ammonia which comprises circulating a confined flowing stream of aqueous liquid from and to a body of said liquid and introducing liquid ammonia directly into said confined flowing stream.

9. The process of treating an aqueous liquid with ammonia which comprises mixing liquid ammonia with a portion of said liquid and passing the resulting product into a body of the liquid.

10. The process of preparing aqua ammonia which comprises mixing liquid ammonia with water and passing the resulting product into a body of aqueous liquid at a point below the surface thereof.

11. The process of preparing aqua ammonia which comprises circulating a confined flowing stream of aqueous liquid from and to a body of the same, mixing said stream of liquid with liquid ammonia and returning the resulting product into said body at a point below the surface thereof.

12. The improvement in the treatment of an aqueous liquid with ammonia which comprises passing liquid ammonia into a body of said liquid and admixing the liquid ammonia with the aqueous liquid at a point below the surface thereof.

13. The method of preparing aqua ammonia which comprises introducing liquid ammonia into a body of water and intimately admixing the liquid ammonia with the water at a point below the surface thereof.

In testimony whereof, I hereunto affix my signature.

EDWARD W. HARVEY.